(12) United States Patent
Matsui et al.

(10) Patent No.: US 7,463,428 B2
(45) Date of Patent: Dec. 9, 2008

(54) LENS BARREL AND PHOTOGRAPHING APPARATUS

(75) Inventors: Kazuaki Matsui, Osaka (JP); Yoshifumi Mitani, Sakai (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 11/893,641

(22) Filed: Aug. 17, 2007

(65) Prior Publication Data

US 2008/0049338 A1 Feb. 28, 2008

(30) Foreign Application Priority Data

Aug. 22, 2006 (JP) .............................. 2006-225121

(51) Int. Cl.
*G02B 15/14* (2006.01)
*G02B 7/02* (2006.01)

(52) U.S. Cl. ....................................... 359/694; 359/823

(58) Field of Classification Search ......... 359/694–704, 359/819–824

See application file for complete search history.

(56) References Cited

U.S. PATENT DOCUMENTS 4,834,514 A * 5/1989 Atsuta et al. ............... 359/699

6,751,031 B2 * 6/2004 Yasutomi .................... 359/819
6,778,335 B2 * 8/2004 Takanashi ................... 359/704

FOREIGN PATENT DOCUMENTS

JP 06-324247 11/1994
JP 11-119078 4/1999

* cited by examiner

*Primary Examiner*—Mohammed Hasan
(74) *Attorney, Agent, or Firm*—Brinks Hofer Gilson & Lione

(57) ABSTRACT

A lens barrel includes a first and second movable frames provided coaxially on an optical axis of a lens, and telescopically moved in and out from a stationary main frame; a first support member engaged with the first movable frame as a first pivot orthogonal to the optical axis, and a second support member engaged with the first movable frame as a second pivot orthogonal to the optical axis and the first pivot, a first connection member pivotally supported on or engaged with the second movable frame as a third pivot or the first movable frame as a fourth pivot; and engaged with the second movable frame as a fifth pivot or the first movable frame as a sixth pivot, wherein arm portions of the first support member and the first connection member are engaged with each other.

13 Claims, 13 Drawing Sheets

LENS BARREL AND PHOTOGRAPHING APPARATUS

This application is based on Japanese Patent Application No. 2006-225121 filed on Aug. 22, 2006, which is incorporated hereinto by reference.

BACKGROUND OF THE INVENTION

The present invention relates to a lens barrel and a photographing apparatus.

In recent years, as personal computers have become more widely used, digital cameras in which images can be easily taken in to personal computers have also become widespread. In addition, it is becoming commonplace for digital cameras to be incorporated into information processing devices such as mobile computers, cellular phones, and personal digital assistants (PDA). As digital cameras have become more widespread, there has been a desire for more compact digital cameras, and the lens unit needs to be even more compact. There is also a demand for a high magnification zoom lens and a zooming mechanism that can be used with the high magnification zoom lens is needed.

Therefore, to make the lens unit compact, as an example of storing telescopically the barrel for holding the lens, there is a mechanism for restricting the posture of a movable frame moving back and forth along a straight line, which is a posture restriction mechanism for the movable frame including a first shaft orthogonal to the straight line, a second shaft orthogonal to both the straight line and the first shaft for restricting the posture of the movable frame, a first holding mechanism, during movement of the movable frame, for holding the first shaft and keeping the orthogonal posture of the first shaft to the straight line, and a second holding mechanism for holding the second shaft and keeping the orthogonal posture of the second shaft to the first shaft, wherein the first holding mechanism and second holding mechanism respectively have either of a cam mechanism including the first shaft and second shaft and an inverse cam mechanism (refer to Unexamined Japanese Patent Application Publication No. 11-119078).

In addition, there is a camera in which the lens barrel is formed from three units which include the stationary barrel which forms a portion of the camera body; the middle barrel which is stored telescopically inside the stationary barrel; and the movable barrel which is also stored telescopically inside the middle barrel, and the inner surface of the stationary barrel has a two-group type zoom device on which a helicoid groove is formed. More specifically, the engagement portion provided on the end portion of the middle barrel is engaged with the helicoid groove. The middle barrel can rotate in both normal and reverse directions via a gear mechanism using a direct current motor, and it moves telescopically with respect to the stationary barrel by the rotation. Further, the helicoid grooves are also formed on the inner surface of the middle barrel and the engagement portion of the end portion of the movable barrel engages with the helicoid grooves. The movable barrel cannot rotate with respect to the stationary barrel and thus when the middle barrel is rotated, it moves telescopically in the same direction as the telescopic movement of the middle barrel (See Unexamined Japanese Patent Application Publication No. 06-324247).

It is to be noted that the lens barrel is telescopically stored and the state of being stored inside the camera body is called collapsed.

However, in the posture restraining mechanism of the movable frame described in Unexamined Japanese Patent Application Publication No. 11-119078, a structure is described in which one movable frame can move with respect to the stationary main frame, but in order to be usable with the high magnification zoom lens of recent years, it is necessary, for example, to increase the length of the arm portion in order to match the zooming mechanism which moves the zoom lens group toward the object side in large dimensions that is closest to the object of the zoom lens and it thus difficult for the length of the arm to be made compact corresponding to the reduced size of the zoom lens. Moreover, there is no disclosure with regard to two or more movable frames.

In addition, the two-group type zooming device described in Unexamined Japanese Patent Application Publication No. 06-324247, is a three unit structure, but it is necessary to form helicoid grooves on the inner surface of the stationary barrel and the middle barrel, and it is also necessary to form helicoid grooves on the end outer surface of the middle barrel and the end outer surface of the movable barrel which engage with these, and thus the mechanism becomes complex. Further, the barrels must be cylindrical because they have helicoid grooves. For this reason, the lens barrel which should correspond to the reduced size resulting from recent zoom lens cannot be made square to match the square shape of the image pickup element.

The present invention was conceived in view of the foregoing and an object thereof is to provide lens barrel which has a compact multilevel collapsing is possible with a simple structure and a photographing apparatus which comprises this lens barrel.

SUMMARY OF THE INVENTION

The aforementioned problems are solved by the structure indicated below.

A lens barrel which holds a lens, includes: a stationary main frame; a first movable frame; a second movable frame, the first movable frame and the second movable frame being provided coaxially in the order toward an optical axis of the lens, and capable of being telescopically moved in and out from the stationary main frame; a first support member having two arm portions, a connecting portion to connect the two arm portions, a first pivot provided orthogonal to the optical axis by which the two arm portions are engaged with the first movable frame, and a pivot parallel with the first pivot by which the first support member is pivotally supported on the stationary main frame; a second support member which is a U-shaped member having two arm portions, a connecting portion to connect the two arm portions, a second pivot orthogonal to the first pivot by which the two arm portions are engaged with the first movable frame, and a pivot parallel with the second pivot by which the second support member is pivotally supported on the stationary main frame; a first connection member which is a U-shaped member comprising two arm portions and a connecting portion to connect the two arm portions, wherein each of one ends of the two arm portions is pivotally supported on the second movable frame by a third pivot parallel with the first pivot, and each of the other ends is engaged with the first movable frame by a fourth pivot parallel with the first pivot, or each of one ends of the two arm portions is engaged with the second movable frame by the third pivot parallel with the first pivot, and each of the other ends is pivotally supported on the first movable frame by the fourth pivot parallel with the first pivot; and a second connection member which is a U-shaped member comprising two arm portions and a connecting portion to connect the two arm portions, wherein each of one ends of the two arm portions is pivotally supported on the second movable frame as a fifth pivot parallel with the second pivot, and each of the other ends is engaged with the first movable frame as a sixth pivot parallel with the second pivot, or each of one ends of the two arm portions is engaged to the second movable frame as the fifth pivot parallel with the second pivot, and each of the other ends is pivotally supported on the first movable frame as the sixth pivot parallel with the second pivot. Each of the two arm portions of the first support member and each of the two arm portions of the first connection member are engaged with each other.

DETAILED DESCRIPTION OF THE PREFERRED EMBODIMENT

Hereinafter, the present invention will be explained on the basis of the embodiment illustrated, though the present invention is not limited to the concerned embodiment.

Figure 12:
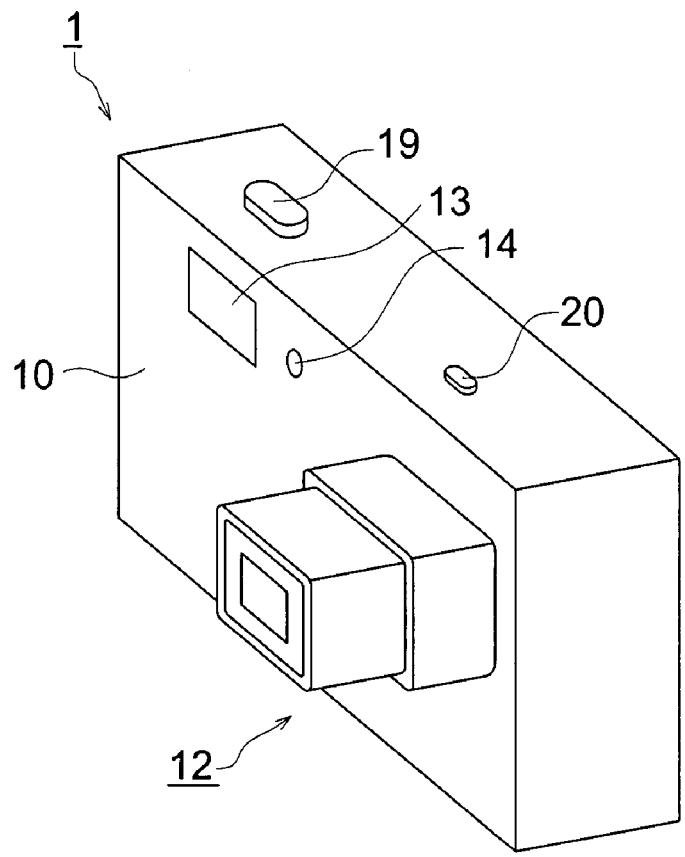
FIGS. 12(a) and 12(b) are a perspective view (a) and a rear view (b) schematically showing the external form of the digital camera of the present invention.
Figure 12:
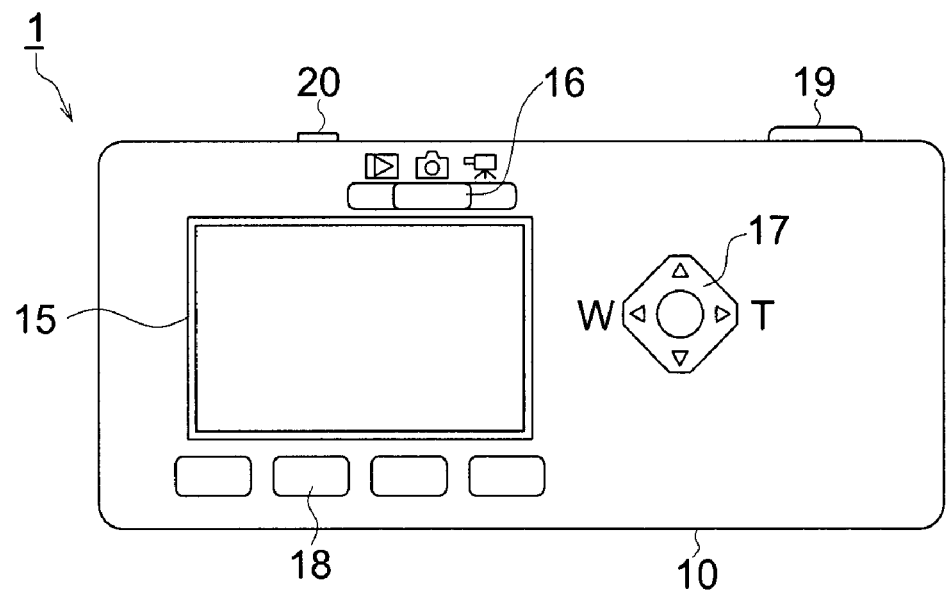

The external view of the digital camera 1, which is a photographing apparatus, is shown as a schematic view in FIGS. 12(a) and 12(b). FIG. 12(a) is a perspective view and FIG. 12(b) is a rear view.

The digital camera 1 is provided with a substantially rectangular camera body 10 and a lens unit 12 which is used by being projected from the camera body 10 at the time of photographing. The projection direction of the lens unit 12 is the depth direction, while the width direction of the camera body 10 is the width direction, and the vertical direction in FIGS. 12(a) and 12(b) is the longitudinal direction.

The digital camera 1 is provided with a lens unit 12, a flash emission section 13 and a self timer lamp 14 at its front surface, and a display section 15, a mode setting switch 16, a cross-shaped key 17 and a plurality of operation keys 18 at its back surface and a release button 19 and a power source button 20 at its top surface.

The lens unit 12 is the zoom lens, and when it is at the operating position, one portion of the lens projects from the front surface of the camera body 10 and then projects further when zooming is done from the wide-angle end to the telephoto end and the remaining lens portion is bent at substantially right angles to the optical axis by the bending member which is described hereinafter and arranged in the lateral direction inside the camera body 10. In addition, the portion of the lens that projects at the operating position is collapsed at the non-operating position when the photographing is not being done and is stored in the storing position inside the camera body 10.

The flash emission section 13 emits flash which irradiates an object. The self timer lamp 14 indicates that self-timed photography by blinking is in preparation.

The display section 15 which is at the rear surface comprises a liquid crystal display device, and in addition to the photographed image, the setting status of the digital camera 1 and various information for operation is displayed. The mode setting switch 16 is a slide type switch and is used in setting the operation modes such as photographing and playing for the digital camera. The cross-shaped key 17 has four contact points which are up, down, left and right, and is used in moving the cursor displayed on the display section 15. The cross-shaped key 17 is also used for adjusting the focal point distance of the lens unit 12. The operation key 18 switches the items to be displayed in the display section 13 and is used for setting related to selection of the displayed items and functions of the digital camera 1. The release button 19 operates at 2 levels and the half pressed state of the release button 19 gives instructions for preparation for photography of the image to be recorded, and the fully pressed state of the release button 19 gives instruction for photographing of the image to be recorded.

Figure 13:
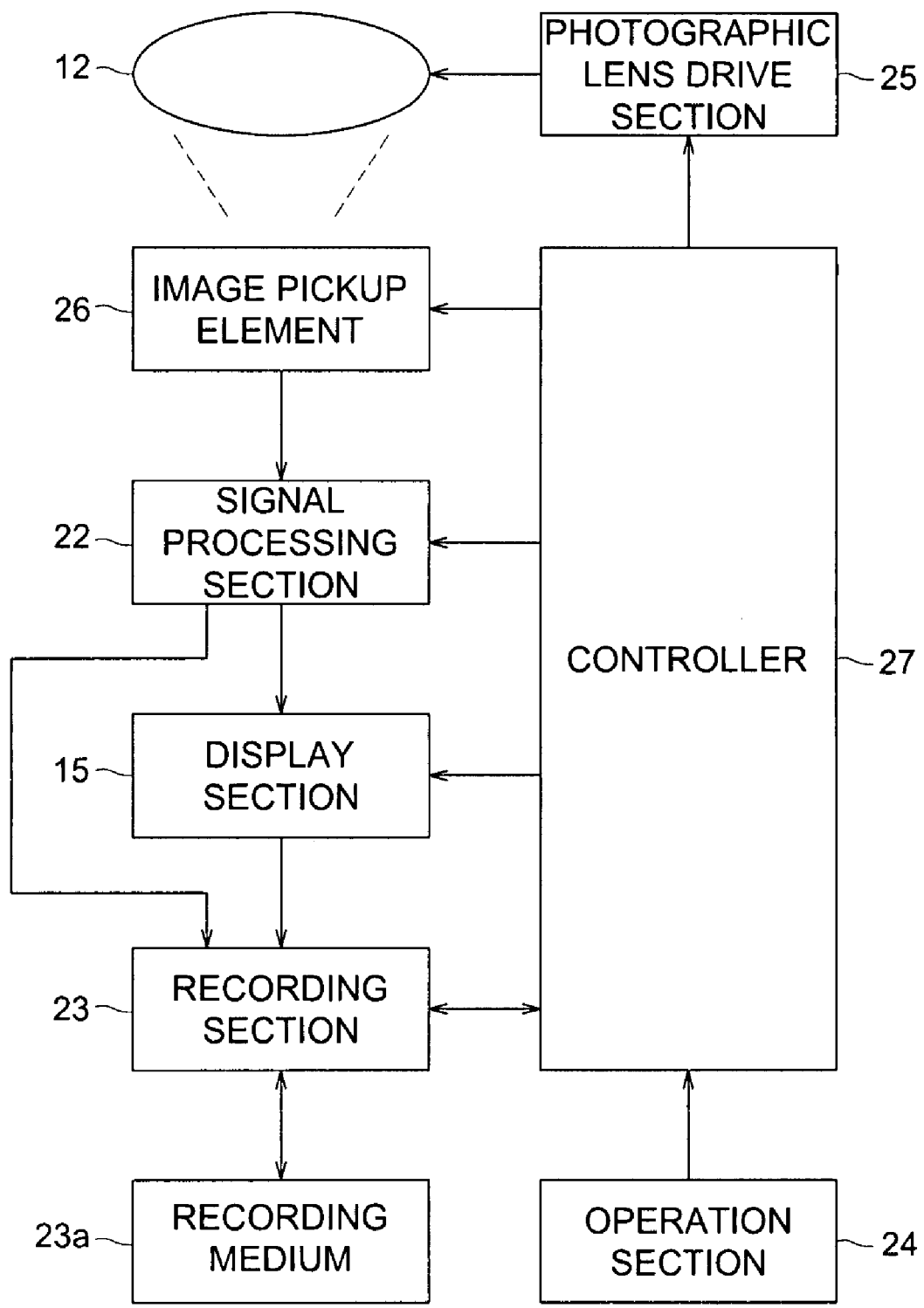
FIG. 13 is a drawing schematically showing the constitution of the digital camera of the present invention.

FIG. 13 is a schematic view showing the structure of the digital camera 1. The digital camera 1 has a lens unit 12 and a display section 15 as well as a image pickup element 26, a signal processing section 22, a recording section 23, an operating section 24, a photographing lens drive section 25 and a control section 27. The image pickup element 26 is a CCD area sensor and it outputs signals which display the amount of light received for each pixel. The image processing section 22 processes the output signals from the image pickup element 26 and creates image data which displays the photographed image. The recording section 23 records the image data created by the image processing section 22 in a removable recording medium 23a and image data is read from the recording medium 23a for display of image reproduction and display. The operation section 24 comprises the mode setting switch 16, the cross-shaped key 17, the operation key 18, the release button 19 and the power button 20 and the information pertaining to the button operated by the user is transmitted to the control section 27.

The photographing lens control 25 controls the driving of motors such as the zoom motor, the focus motor, the shutter and aperture motor for adjusting light exposure amount. The photographing lens drive section 25 may also be provided at the lens unit 12.

The control section 27 has function which perform a series of operations which include controlling the operation of each part of the digital camera 1 based on a control program, and when the release button is half pressed, preparations for photographing the object such as setting of the exposure control value and focus adjustment are performed and when the release button 19 is fully pressed, the image pickup element 26 is exposed and the image signals obtained due to the exposure are subjected to prescribed image processing and recorded on the recording medium 23a.

The structure of the lens unit 12 is described as an embodiment.

Figure 1:
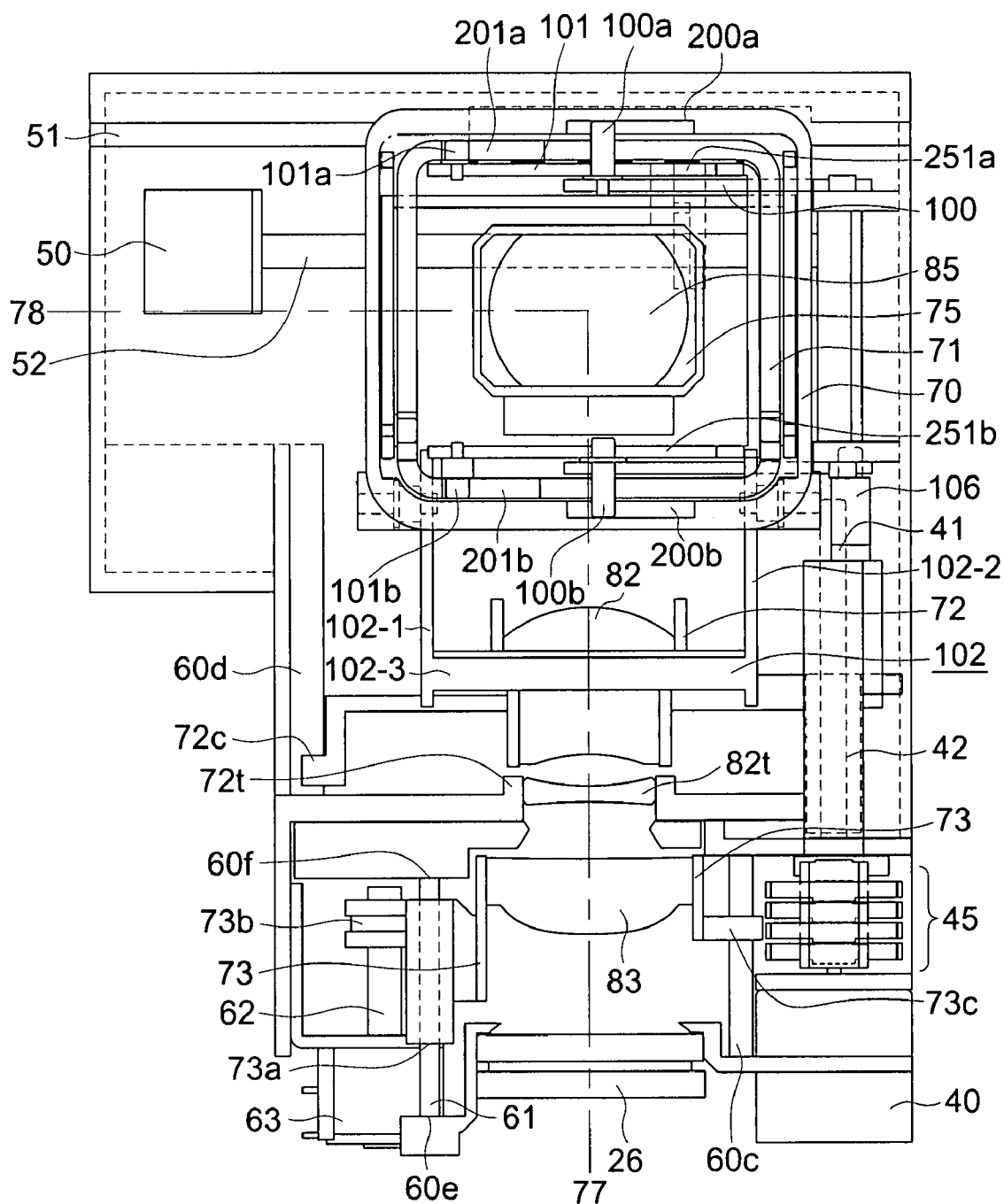
FIG. 1 is a front view of the lens unit.
Figure 2:
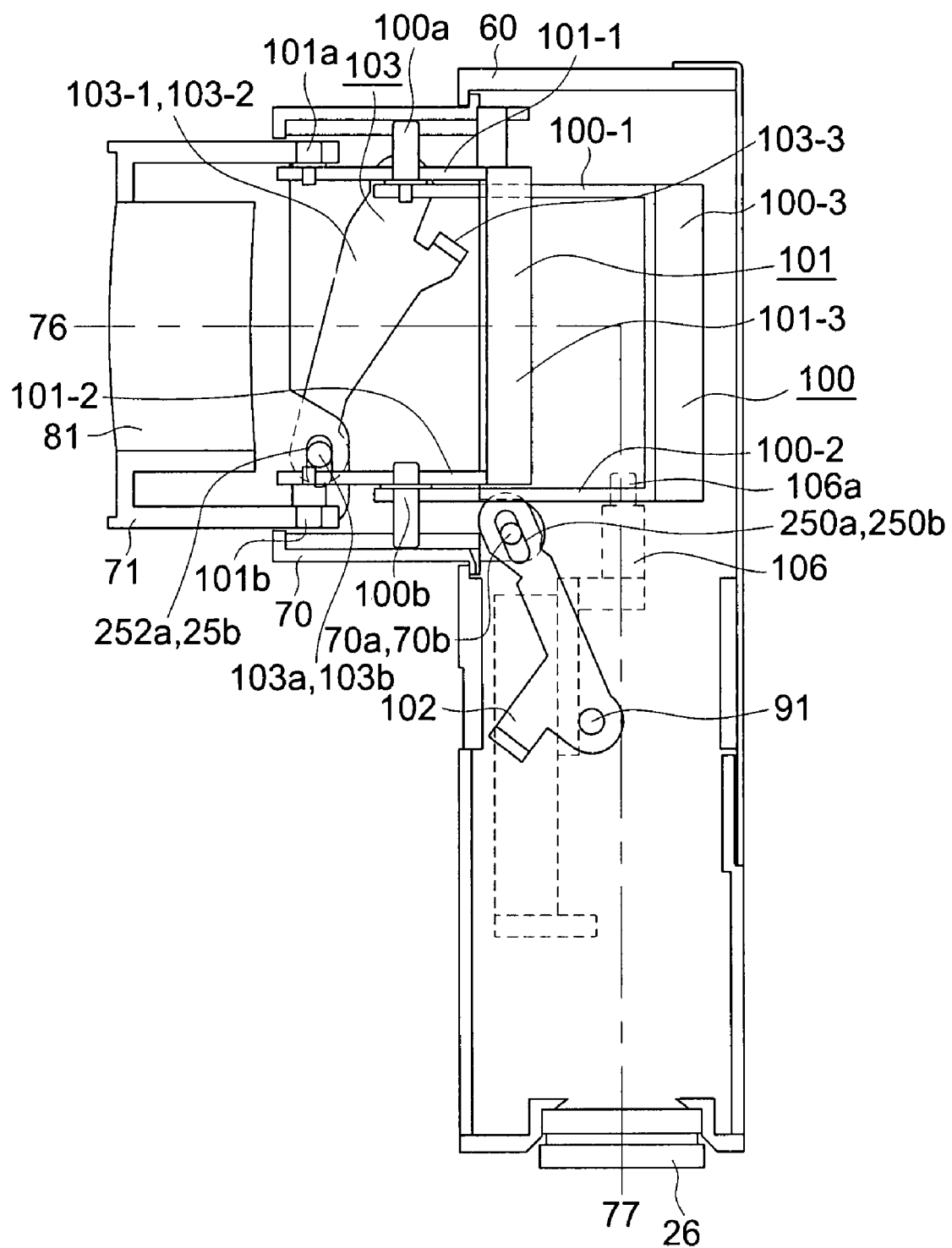
FIG. 2 is a side view of the lens unit in the wide-angle state.
Figure 3:
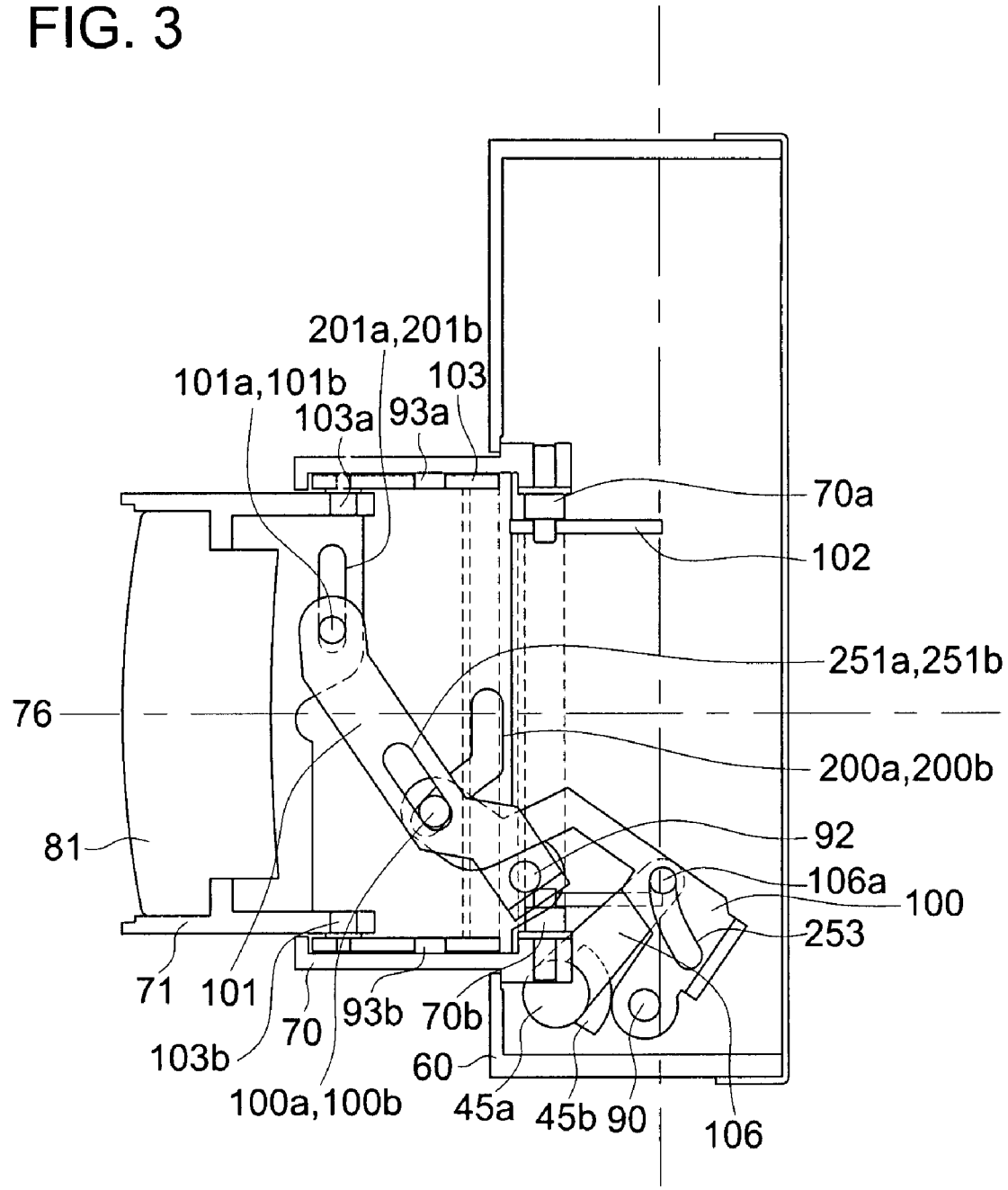
FIG. 3 is a top view of the lens unit in the wide-angle state.
Figure 4:
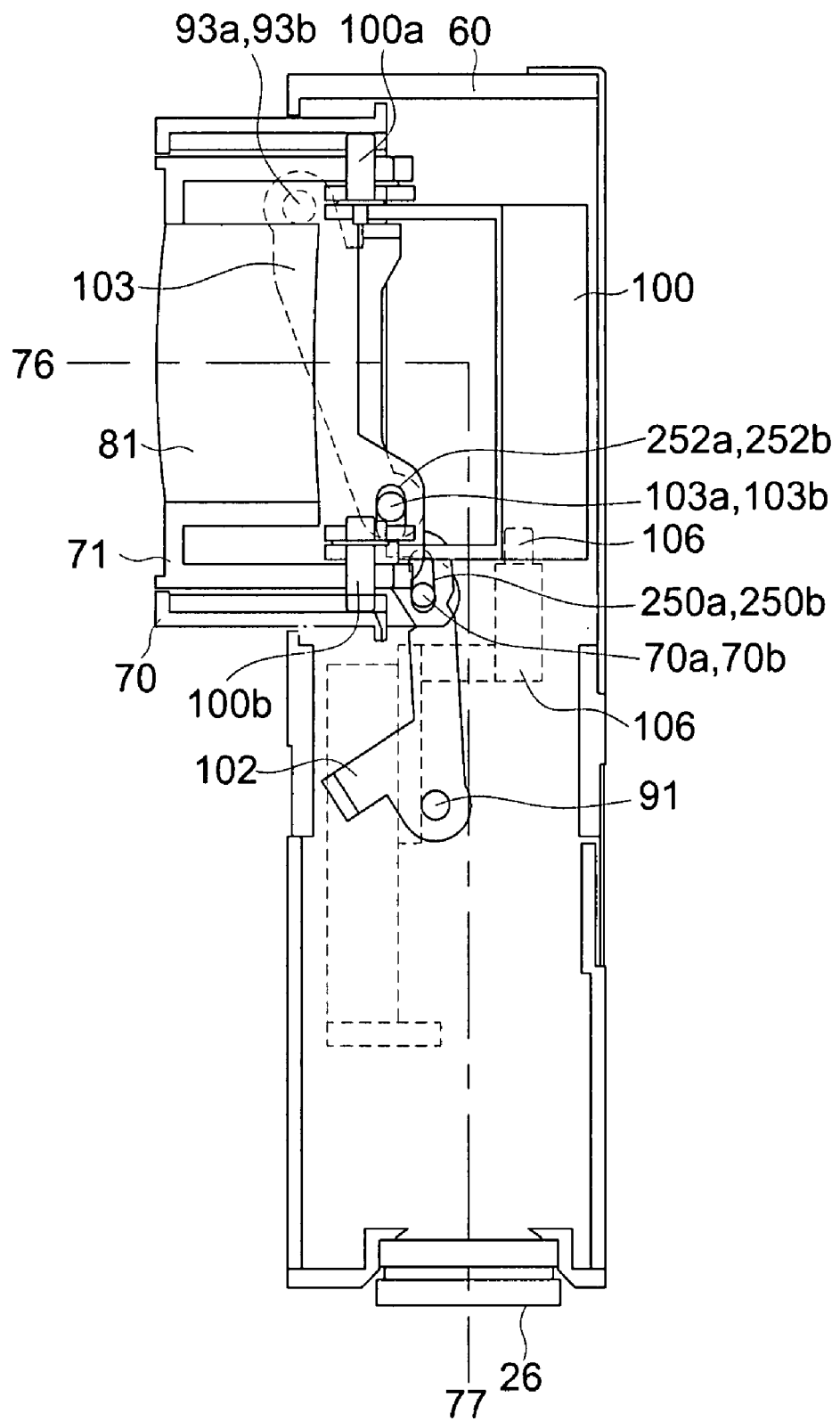
FIG. 4 is a side view of the lens unit in the telephoto state.
Figure 5:
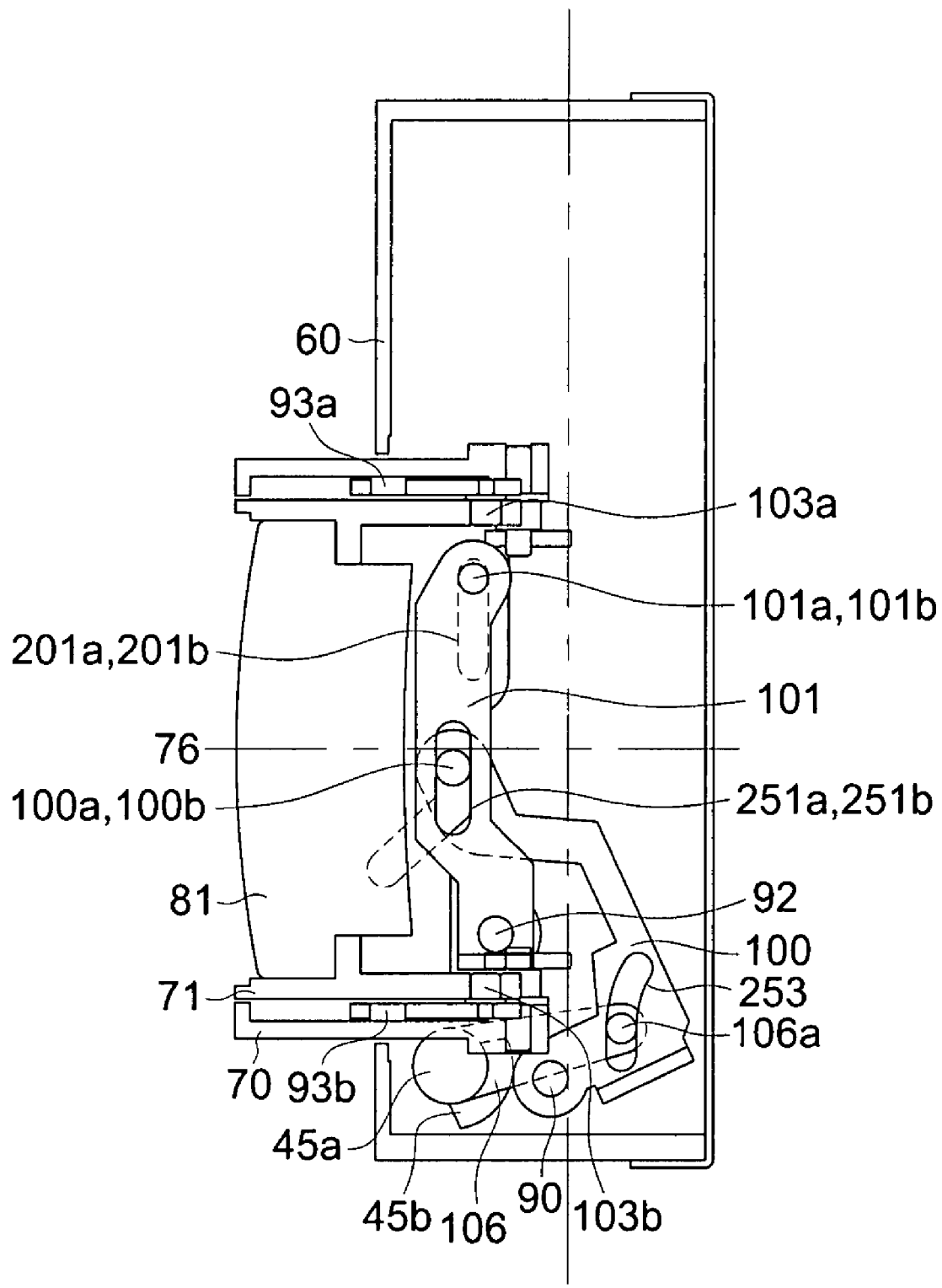
FIG. 5 is a top view of the lens unit in the telephoto state.
Figure 6:
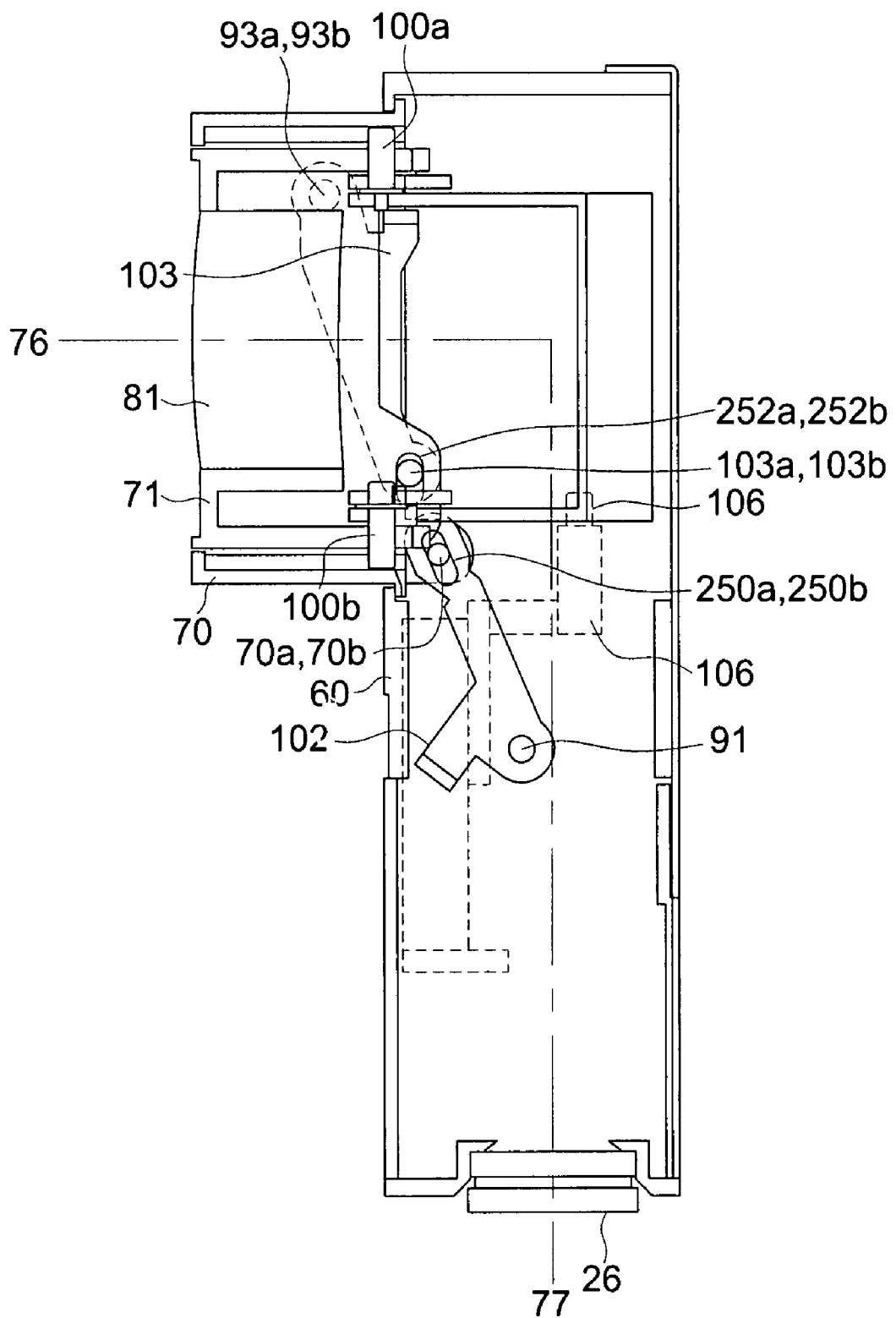
FIG. 6 is a side view of the lens unit when inserting or removing the prism.
Figure 7:
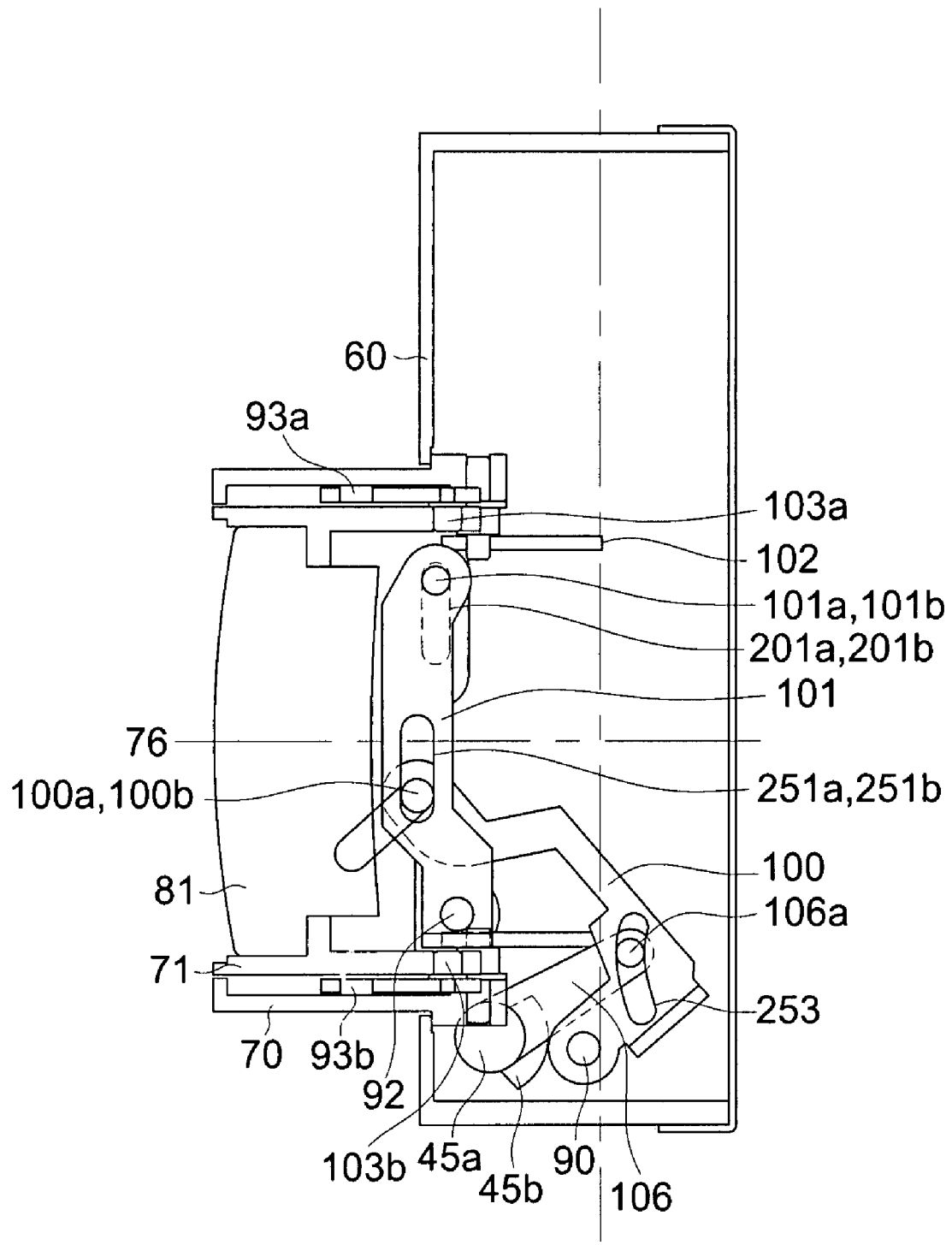
FIG. 7 is a top view of the lens unit when inserting or removing the prism.
Figure 8:
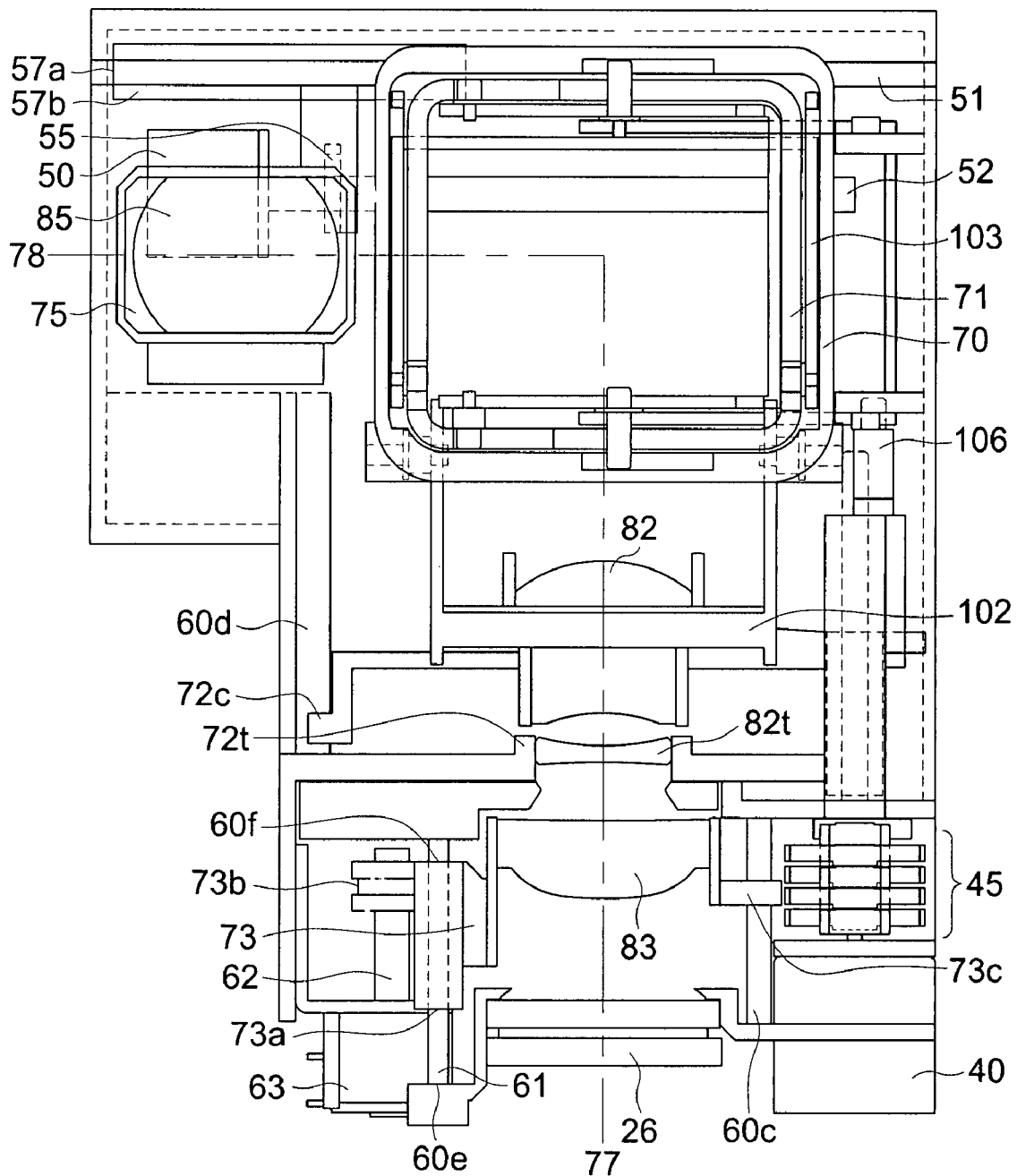
FIG. 8 is a front view of the lens unit in the collapsed state.
Figure 9:
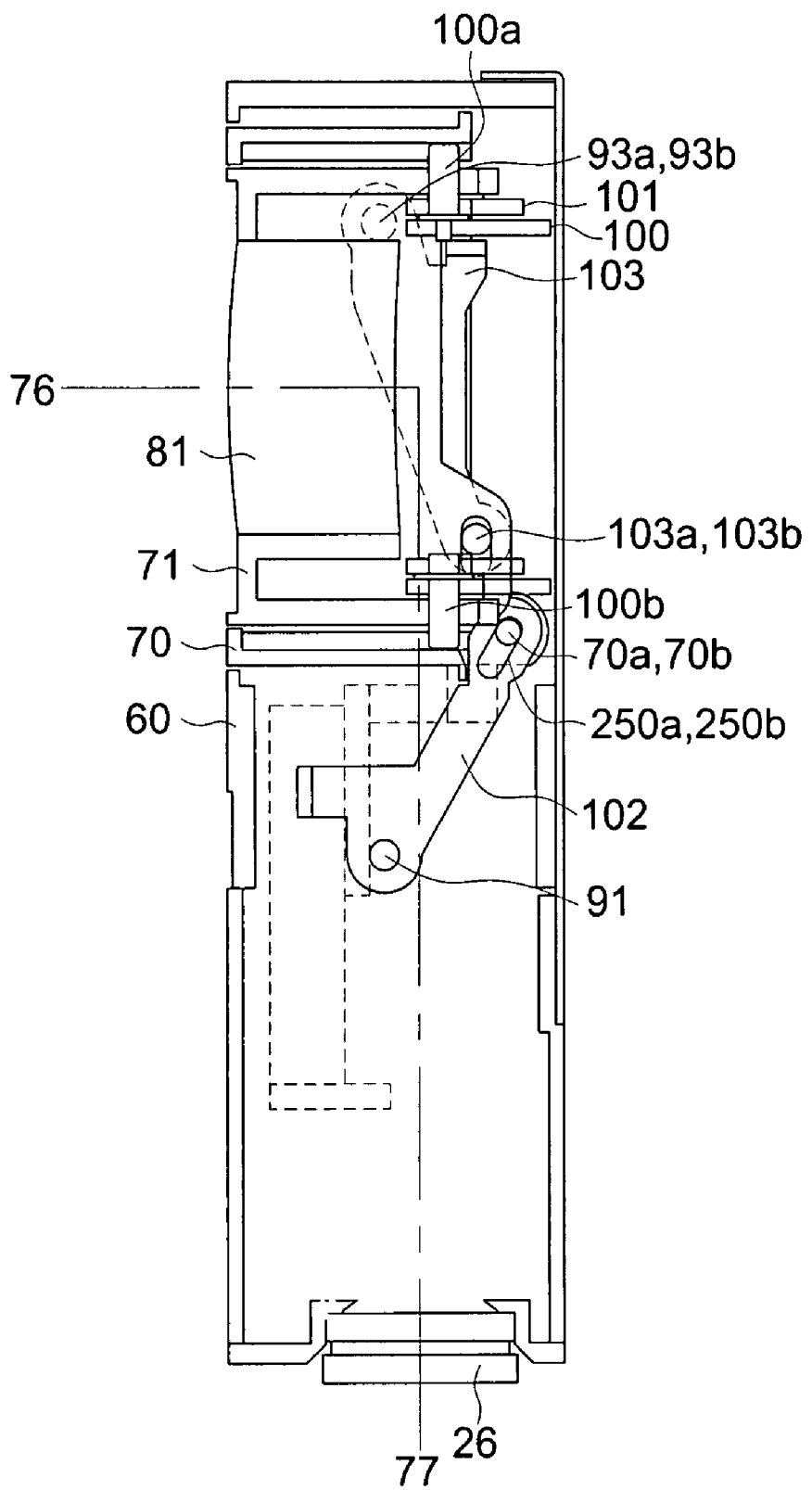
FIG. 9 is a side view of the lens unit in the collapsed state.
Figure 10:
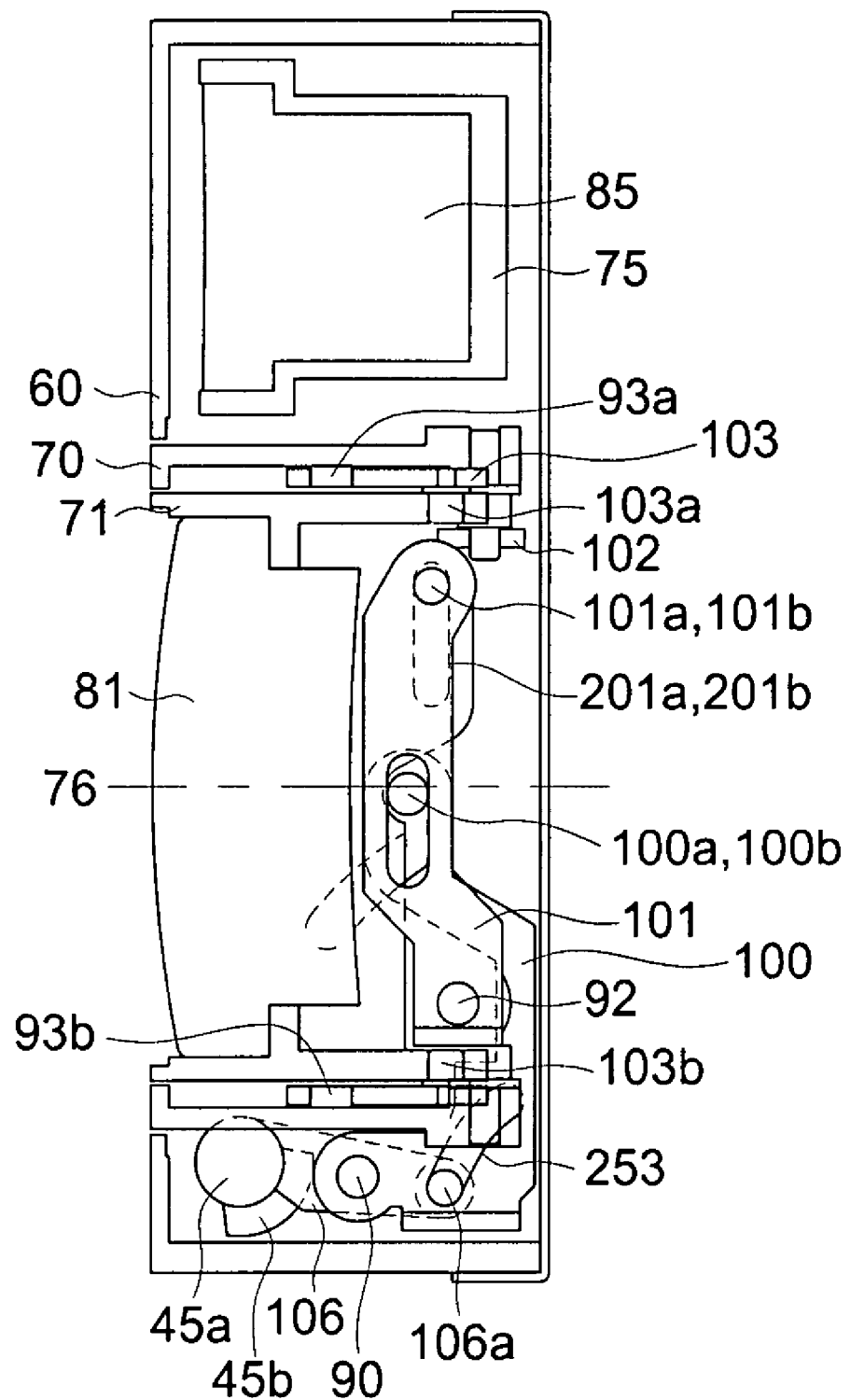
FIG. 10 is a top view of the lens unit in the collapsed state.
Figure 11:
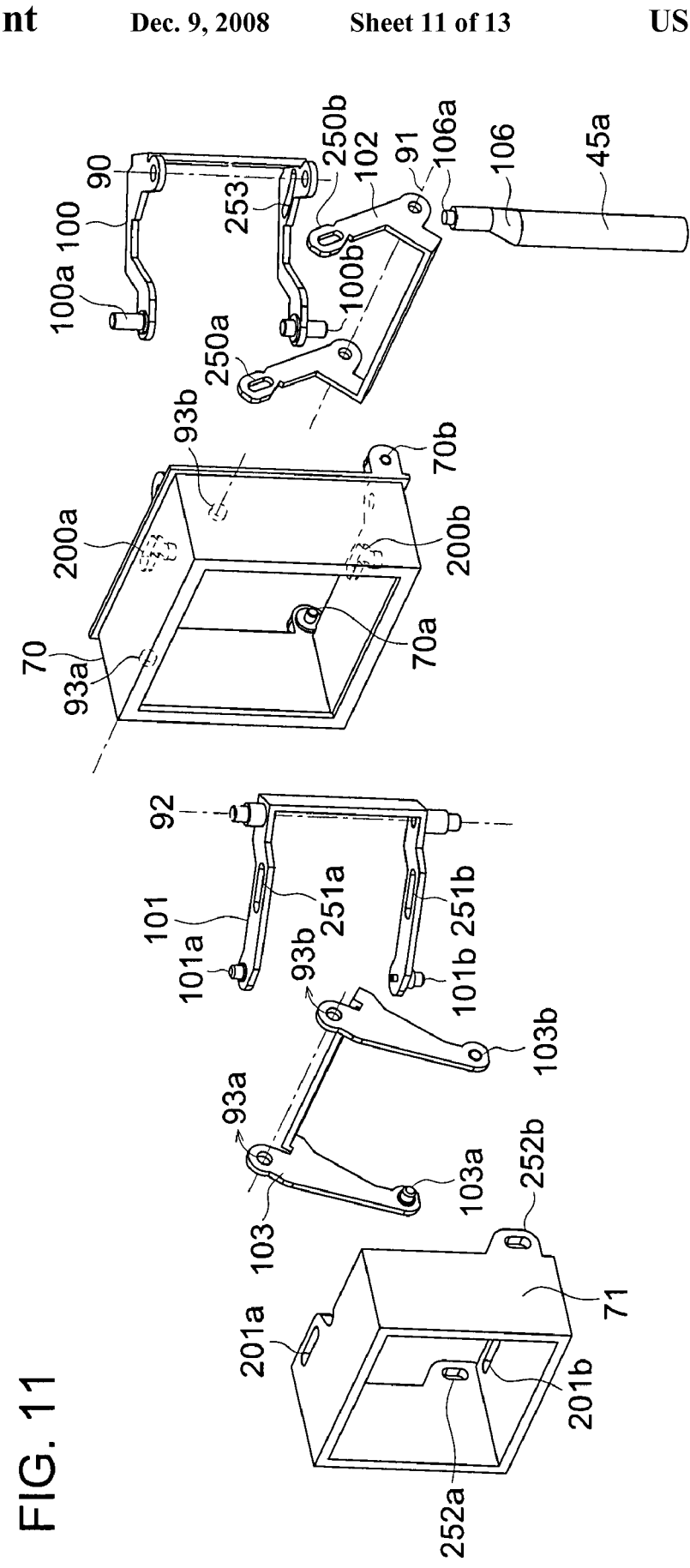
FIG. 11 is an exploded perspective view around the first straight moving tube and second straight moving tube of the lens unit.

FIG. 1 is a front view of the lens unit 12 in the wide angle state, and FIG. 2 is a side view of the lens unit 12 in the telephoto state, and FIG. 3 is a top view of the lens unit 12 in the telephoto state, and FIG. 4 is a side view of the lens unit 12 in the wide angle state, and FIG. 5 is a top view of the lens unit 12 in the wide angle state, and FIG. 6 is a side view of the position (prism insertion and removal position) where a first straight moving tube 70 and a second straight moving tube 71 are moved when collapsed or when started, and FIG. 7 is a top view of the position (prism insertion and removal position) where the first straight moving tube and second straight moving tube are moved when collapsed or when started, and FIGS. 8, 9, and 10 are respectively a front view, a side view, and a top view in the collapsed state. FIG. 11 is an exploded perspective view around the first straight moving tube and second straight moving tube. The side view does not show the bending member and the second and third lens groups and is used to explain the first straight moving tube 70 and second straight moving tube 71 which are a first lens group 81 and a movable frame for holding and moving the first lens group 81 and the movement of the member for driving the straight moving tubes.

Firstly, the constitution of the lens unit 12 will be explained by referring to FIGS. 1 to 5. In the lens unit 12, the vertical direction is assumed as the same direction as the direction of an optical axis 77 and the horizontal direction is assumed as a direction perpendicular to both the optical axis 77 and an optical axis 76. Further, the lens unit 12 is arranged in the camera frame with the vertical direction thereof kept unchanged and assumed as a vertical direction of a digital camera 1.

The photographic lens of the lens unit 12 shown in FIG. 1 includes, in the order from the photographic object side, the first lens group 81, a prism 85, a second lens group 82 including an image stabilizer lens group 82t, and a third lens group 83. The first lens group 81 is installed on the first optical axis 76 and the second lens group 82 and third lens group 83 are installed on the second optical axis 77. The photographic lens focuses light from a photographic object on an image pickup element 26.

The prism 85 is a triangular prism having a section of a right-angled isosceles triangle and is arranged so that the inclined planes form an angle of 45° with the first optical axis 76 and second optical axis 77, and bends the first optical axis 76 at almost right angles to the direction of the second optical axis 77.

The second straight moving tube 71 holds the first lens group 81, and a prism holding member 75 holds the prism 85, and a second holding member 75 holds the second lens group 82, and a third holding member 73 holds the third lens group 83. Further, the prism 85 for bending the optical path may be a plate-like mirror. An image stabilizer unit 72t holds the image stabilizer lens 82t movably in the vertical plane to the second optical axis 77 and corrects a displacement of the optical axis due to hand shake of the camera. Further, a shutter unit (not illustrated) is fixed to the second holding member 72.

At time of zooming operation, the first lens group 81, second lens group 82, and third lens group 83 move and at time of focusing operation, the third lens group 83 moves. Further, the image stabilizer lens group 82t, not only at time of zooming, is fixed in the direction of the optical axis. When the variable power is carried out from the wide-angle end to the telephoto end, the first lens group 81 moves toward the photographic object, and the second lens group 82 moves toward the prism 85, and the third lens group 83 moves to the image pickup element 26.

The constitution for moving the first lens group 81 at time of zooming, for example, as shown in FIG. 2 or 3, includes the second straight moving tube 71 as a second movable frame for holding the first lens group 81, the first straight moving tube 70 as a first movable frame outside the second straight moving tube 71, and a frame 60 as a stationary main frame outside the first straight moving tube 70. The first straight moving tube and the second straight moving tube have the shape of a square tube respectively.

The first straight moving tube 70 is engaged with a first drive member also referred to as first support member) 100 pivotally supported by a pivot 90 on the frame 60. And the first straight moving tube 70 is engaged with a first driven member (also referred to as second support member) 102 pivotally supported by pivot 91. The pivots 90 and 91 are respectively orthogonal to the optical axis 76 and moreover orthogonal to each other. The first drive member 100 as a first support member is formed in the U shape by two arm portions 100-1 and 100-2 which interpose the optical axis 76 between them and a connecting portion which connects the two arm portions (refer to FIG. 2). The first driven member 102 as a second support member is similarly formed in the U shape by two arm portions 102-1 and 102-2 and a connecting portion 102-3 (refer to FIG. 1). The first drive member 100 and the first driven member 102 are arranged at the position where the two are orthogonal to the optical axis 76.

At the end of the first drive member 100 opposite to the pivot 90 for support it, pins 100a and 100b are provided as a first pivot parallel with the pivot 90 (refer to FIG. 3). The pins 100a and 100b are engaged to guide grooves 200a and 200b provided above and under the first straight moving tube 70. Further, at the end of the first driven member 102 opposite to the pivot 91 for support it, elongated holes 250a and 250b are formed (refer to FIG. 2). The elongated holes 250a and 250b are engaged to pins 70a and 70b provided in the transverse direction of the first straight moving tube 70 as a second pivot parallel with the pivot 91. When the first drive member 100 is rotated around the pivot 90, the first straight moving tube 70 having the guide grooves 200a and 200b engaged to the pins 100a and 100b moves forward and backward in the direction of the optical axis 76. When the first straight moving tube 70 moves forward and backward along the optical axis, the pins 70a and 70b also move and in correspondence with it, the first driven member 102 is rotated around the pivot 91.

The first drive member 100 and first driven member 102 which are pivotally supported on the frame 60 and are orthogonal to each other in the U shape are engaged and held to the first straight moving tube 70, so that the posture of the first straight moving tube 70 is subject to restriction on the shift in the transverse and vertical directions and the rotation around the optical axis 76, and the first straight moving tube 70 moves precisely along the optical axis 76.

To the second straight moving tube 71 for moving in and out from the first straight moving tube 70, the second drive member (also referred to as a first connection member) 101 pivotally supported on the first straight moving tube 70 with the pivot 92, and the second driven member (also referred to as a second connection member) 103 pivotally supported on the second drive member 101 and pivots 93a and 93b are engaged. The pivot 92 and pivots 93a and 93b are respectively orthogonal to the optical axis 76 and moreover orthogonal to each other.

The second drive member 101 is formed in the U shape by two arm portions 101-1 and 101-2 which interpose the optical axis 76 between them and a connecting portion 101-3 which connects the two arm portions (refer to FIG. 2). The second driven member 103 as a second connection member is similarly formed in the U shape by two arm portions 103-1 and 103-2 and a connecting portion 103-3 (refer to FIG. 2). The respective arm portions of the second drive member 101 and second driven member 103 are arranged at the position where the two are orthogonal to the optical axis 76.

At the ends of the arm portions of the second drive member 101, the pivot 92 as a fourth pivots parallel with the first pivot is provided, and at the other ends of the arm portion, pins 101a and 101b as a third pivot parallel with the first pivot are provided (refer to FIG. 3). The pins 101a and 101b are engaged to guide grooves 201a and 201b provided above and under the second straight moving tube 71. Further, between the pivot 92 of the second drive member 101 and the pins 101a and 101b, elongated holes 251a and 251b are formed and to the elongated holes 251a and 251b, the pins 10a and 100b provided on the first drive member 100 are engaged. Therefore, the second drive member 101 composes a drive arm driven to rotate around the pivot 92 by the first drive member 100.

At the ends of the arm portions of the second driven member 103, the pivots 92a and 93b as a sixth pivot parallel with the second pivot are provided, and at the other ends of the arm portions, pins 103a and 103b as a fifth pivot parallel with the second pivot are provided (refer to FIG. 2). The pins 103a and 103b are engaged to elongated holes 252a and 252b provided on the left and right of the second straight moving tube 71. When the first drive member 100 is rotated, the second drive member 101 having the elongated holes 251a and 252b engaged to the pins 100a and 100b is driven and the second straight moving tube 71 having the guide grooves 201a and 201b engaged to the pins 101a and 101b moves forward and backward in the direction of the optical axis 76. When the second straight moving tube 71 moves forward and backward along the optical axis, the pins 103a and 103b also move and in correspondence with it, the second driven member 103 is rotated using the pins 93a and 93b as a rotary shaft.

The second drive member 101 and second driven member 103 which are pivotally supported on the first straight moving tube 70 and are orthogonal to each other in the U shape are engaged to and hold the second straight moving tube 71, so that the posture of the second straight moving tube 71 is subject to restriction on the shift in the transverse and vertical directions and the rotation around the optical axis 76, and the second straight moving tube 71 moves precisely along the optical axis 76.

By taking a constitution that the arm portions 103-1 and 103-2 on the left and right sides of the second driven member 103 which support the second straight moving tube 71 in the transverse direction, slide on the outer side of the second straight moving tube 71 and on the inner side of the first straight moving tube 70, so that the posture of the second straight moving tube 71 is subject to restriction on the shift in the transverse direction and the rotation around the optical axis 76, and the second straight moving tube 71 moves more precisely along the first straight moving tube 70. As mentioned above, the first straight moving tube 70 moves precisely along the optical axis 76, so that the second straight moving tube 71 moving along the first straight moving tube 70 also moves precisely along the optical axis 76.

Further, the second drive member 101 is pivotally supported with the pivot 92 as a fourth pivot on the first straight moving tube 70, which is a first movable frame, and the pins 101a and 101b as a third pivot are engaged to the second straight moving tube 71 which is a second movable frame. The relationship between the support and the engagement can be reversed. Similarly, the second driven member 103 is pivotally supported with the pivots 93a and 93b as a sixth pivot on the first straight moving tube 70, which is a first movable frame, and the pins 103a and 103b as a fifth pivot are engaged to the second straight moving tube 71 which is a second movable frame. The relationship between the support and the engagement can be reversed.

Further, for example, when a third straight moving tube (not illustrated) drivable is additionally installed inside the second straight moving tube 71, the third straight moving tube can move precisely along the optical axis 76 by providing a third drive member (not illustrated) and a third driven member (not illustrated) which are similar to the second drive member 101 and second driven member 103 provided in the second straight moving tube 71.

For example, the third drive member and third driven member in the U shape which are respectively pivotally supported on pivots in parallel with the third pivot and fifth pivot supported on the second straight moving tube 71, are engaged to the third straight moving tube. The respective two arm portions of the third drive member and third driven member are at the position where they are orthogonal to the optical axis 76. At the ends of the two arm portions opposite to the pivot side for supporting the third drive member, pins parallel with the pivot are installed. The pins are engaged with the guide grooves formed above and under the third straight moving tube. Further, on the arm positions of the third drive member, elongated holes are formed between the pivot for supporting the third drive member and the pins and the pins 101a and 101b formed on the second drive member 101 are engaged to the elongated holes.

When such a drive member and a driven member are provided on a straight moving tube, a multistage and removable barrel is formed. When forming a straight moving tube in a multistage such as three or more stages, it is more preferable to install the pivot for supporting the drive member on the preceding straight moving tube from the viewpoint that the arm portions of the drive member can be shortened.

When a first motor 40 rotates, the rotation driving force decelerated by a reduction gear train 45 rotates a drive pivot member 106 (refer to FIG. 1). As shown in FIGS. 3 and 5, to the first drive member 100 having a elongated hole 253 engaged to a pin 106a of the drive pivot member 106, the drive force is transmitted, and when the first drive member 100 rotates around the pivot 90, the first straight moving tube 70 having the guide grooves 200a and 200b engaged to the pins 100a and 100b moves straight in the direction of the optical axis 76, and to the second drive member 101 having the elongated holes 251a and 251b engaged to the pins 100a and 100b of the first drive member 100, the drive force is transmitted, and the second drive member 101 rotates around the pivot 92, and the second straight moving tube 71 having the guide grooves 201a and 201b engaged to the pins 101a and 100b moves straight in the direction of the optical axis 76.

For example, in FIG. 5 in which the first lens group 81 held by the second straight moving tube 71 is positioned at the wide-angle end, when the drive pivot member 106 is rotated counterclockwise, the drive force is transmitted to the first drive member 100 and second drive member 101, and the first straight moving tube 70 and second straight moving tube 71 respectively engaged to them are driven on the photographic object side, and as shown in FIG. 3, reach the telephoto end. When the drive pivot member 106 is rotated clockwise in this state, the first lens group 81 reaches from the telephoto end to the wide-angle end. Further, between the telephoto end and the wide-angle end, there is a prism insertable and removable position which will be described later.

Therefore, as described above, by a simple constitution that the first straight moving tube has the first drive member 100 and first driven member 102 which are pivotally supported on the frame and the second straight moving tube has the second drive member 101 and second driven member 103, a mechanism for engaging the first drive member and second drive member, thereby transferring the drive force at a long distance can be formed, so that the first lens group 81 can be moved precisely at a long distance.

Next, the constitution of the movement for zooming of the second holding member 72 will be explained by referring to FIG. 1. A first guide pivot 41 is arranged in parallel with the second optical axis 77 and both ends thereof are fixed to the wall surface of the frame 60. Further, the first guide pivot 41 is fitted into a first sliding guide hole 42 of the second holding member 72 which is a guide section and guides the second holding member 72 so as to move the second holding member 72 in the direction of the second optical axis 77 without inclining to the second optical axis 77. A rotation stopping section 72c is engaged to a control section 60d of the frame 60 and the second holding member 72, when moving, is controlled to rotate around the optical axis 77.

Furthermore, the second holding member 72 is urged by a second spring (not illustrated) on the side of the image pickup element 26 in the direction of the second optical axis 77 and a guide pin (not illustrated) of the second holding member 72 is in contact with a displacement contact section 45b of a cam installed on the same drive pivot 45a as the drive pivot member 106 for rotating the first motor 40 by decelerating it by the deceleration gear train 45. By the rotation of the drive pivot 45a, the displacement contact section 45b is always in contact with the guide pin (not illustrated), so that the second holding member 72 moves for zooming. As mentioned above, the drive pivot 45a is a member for permitting the second holding member 72 to move for zooming and simultaneously, as explained previously, moves the first straight moving tube 70 and second straight moving tube 71 in link motion.

Further, the constitution of the movement for zooming of the third holding member 73 is that the third guide pivot 61 is arranged in parallel with the second optical axis 77, and one end thereof is fixed to a wall surface 60e of the frame 60, and the other end thereof is fixed to a wall surface 60f at the center, and a third sliding guide hole 73a of the third holding member 73 is fitted into it, and the third holding member 73 is guided so as to move in the direction of the optical axis 77 without inclining to the second optical axis 77. The rotation stopping section 73c is engaged to the control section 60c of the frame 60, thereby prevents the third holding member 73, when moving, from rotation around the optical axis. The third drive pivot 62 engaged to the rotary shaft of the third motor 63 is arranged in parallel with the second axis 77, and a spiral thread is formed on the outer peripheral surface thereof and is engaged with a engaging screw 73b connected to the sliding guide section 73a of the third holding member 73.

When the third motor 63 rotates, by the lead of screw of the third drive pivot 62, the third holding member 73 moves in the direction of the optical axis so as to focus on the image pickup element 26.

When the lens is collapsed, as shown in FIGS. 6 and 7, the second straight moving tube 71 and first straight moving tube 70 move to the prism insertion and removal position, and next, as shown in FIGS. 8 to 10, the prism holding member 75 for holding the prism 85 recedes along an axis 78 perpendicular to the optical axes 76 and 77, and then the second straight moving tube 71 and first straight moving tube 70, in the space which is formed by movement of the prism holding member 75, moves on the first optical axis 76 and is collapsed and stored. At this time, the first straight moving tube 70, second straight moving tube 71, and second holding member 72 move in link motion.

When the first motor 40 is driven, the drive pivot member 106 rotates, and the drive force is transmitted to the first drive member 100 and second drive member 101, and the first straight moving tube 70 and second straight moving tube 71 move to the prism insertion and removal position between the wide angle end and the telephoto end (refer to FIGS. 6 and 7).

Next, the prism holding member (bending section holding member) 75 for holding the prism 85 is receded to the receded position. By referring to FIG. 8, a mechanism for moving the prism holding member 75 to the receded position will be explained. The prism holding member 75 for holding the prism 85 has a second sliding guide section 57b and a second sliding guide hole 57a and the second sliding guide hole 57a is fitted into the second guide pivot 51 fixed to the frame 60. Further, the second sliding guide section 57b moves by a bending-moving member composed of a second drive pivot 52 driven by a second motor 50 and a joint screw 55. The sliding guide section 57b is connected to the engagement screw 55, and by the rotation of the second motor 50, the second drive pivot 52 rotates, and by the rotation, the engagement screw 55 moves, thus the prism holding member 75 moves along the second guide pivot 51 and recedes to the receded position shown in FIGS. 8 and 10.

Then, the first motor 40 is driven and by the rotation of the first drive member 100, the first straight moving tube 70 moves to the collapsed position (refer to FIGS. 9 and 10). At this time, the first drive member 100 is driven, thus the second drive member 101 is driven, though the guide grooves 200a and 200b of the first straight moving tube 70 to which the pins 100a and 100b of the first drive member 100 are engaged and the elongated holes 251a and 251b of the second drive member 101 are the same in the shape from the removable position, so that the second drive member 101 does not rotate. That is, the guide grooves 200a and 200b having portions which extend in a direction perpendicular to the optical axis, and the elongated holes 251a and 251b which extend in the direction perpendicular to the optical axis, are overlapped with each other, thereby the first straight moving tube 70 and the second straight moving tube 71 move integrally. Therefore, the first straight moving tube 70 and second straight moving tube 71 are pulled in the frame 60 in the state that the same positional relationship as the insertion and removal position is kept and the collapsed operation is completed.

When the lens movement is started, the operation is performed in the reverse order of the lens collapsed operation. Namely, the second straight moving tube 71 and first straight moving tube 70 move to the prism insertion and removal position. From the collapsed position to the prism insertion and removal position, the guide grooves 200a and 200b of the first straight moving tube 70 to which the pins 100a and 100b of the first drive member 100 are engaged and the elongated holes 251a and 251b of the second drive member 101 are the same in the shape, so that the first straight moving tube 70 and second straight moving tube 71 complete the operation of moving to the prism insertion and removal position in the state that the same position relationship as the collapsed operation is kept.

Therefore, as described above, by a simple constitution that the first straight moving tube has the first drive member 100 and first driven member 102 which are pivotally supported on the frame and the second straight moving tube has the second drive member 101 and second driven member 103, a drive transfer mechanism for engaging the first drive member and second drive member, thereby folding and piling the respective drive members to make them compact can be formed further, so that the thickness when collapsed can be made thinner.

Further, between the lens collapsed position and the prism insertion and removal position, the first straight moving tube 70 and second straight moving tube 71 are simultaneously moved integrally, thus the zoom lens storing time for changing the photographable state to the collapsed state and the zoom lens starting time for changing the collapsed state to the photographable state are shortened and an easily-usable lens unit realizing quick storage and start can be obtained.

Next, the prism holding member 75 moves to the optical path bending position for linking the first optical axis 76 with the second optical axis 77. When the movement of the prism holding member 75 to the predetermined optical path bending position aforementioned is completed, an optical system of forming an image on the image pickup element 26 can be formed by the first lens group, second lens group, and third lens group. Then, the prism holding member 75 moves to a desired zooming position by the zooming operation and performs photographing.

When the aforementioned lens unit 12 is equipped, a photographing apparatus having a lens barrel for forming compact multistage collapse by a simple constitution, for example, a digital camera can be formed.

The lens barrel of this embodiment is square similarly to the shape of the photoelectric conversion surface of a CCD (Charge Coupled Device), though it may be, for example, hexagonal by cutting the corners thereof or may be almost square by rounding the corners thereof. Such configurations are also in the categories of square tube.

According to the embodiment of the present invention, the lens barrel includes the stationary main frame and the first movable frame and second movable frame which can be telescopically moved in and out from the stationary main frame arranged coaxially. To the first movable frame, the first support member and second support member in the U shape which are pivotally supported on the stationary main frame and are mutually orthogonal are engaged by the first and second pivots. To the second movable frame, the first connection member and second connection member in the U shape which are pivotally supported or engaged to the first movable frame by the fourth and sixth pivots and are mutually orthogonal are engaged or pivotally supported by the third and fifth pivots. Furthermore, the first support member and the drive arm formed by the first connection member are engaged to each other.

Therefore, the first support member is driven, thus the first movable frame restricted by the first and second support members mutually orthogonal is driven precisely, and by the drive arm for engaging to the first support member, thereby obtaining drive force, the second movable frame restricted by the first connection member and second connection member which are mutually orthogonal is driven precisely.

Further, by use of the lens barrel having the aforementioned effect, the photographing apparatus is formed.

Therefore, a lens barrel for forming compact multistage collapse by a simple constitution and a photographing apparatus having the concerned lens barrel can be provided.

What is claimed is:

1. A lens barrel which holds a lens, comprising:
   (a) a stationary main frame;
   (b) a first movable frame having the shape of a square tube;
   (c) a second movable frame having the shape of a square tube, the first movable frame and the second movable frame being provided coaxially in the order toward an optical axis of the lens, and capable of being telescopically moved in and out from the stationary main frame;
   (d) a first support member comprising two arm portions, a connecting portion to connect the two arm portions, a first pivot provided orthogonal to the optical axis by which the two arm portions are engaged with the first movable frame, and a pivot parallel with the first pivot by which the first support member is pivotally supported on the stationary main frame;
   (e) a second support member comprising two arm portions, a connecting portion to connect the two arm portions, a second pivot orthogonal to the optical axis and the first pivot by which the two arm portions are engaged with the first movable frame, and a pivot parallel with the second pivot by which the second support member is pivotally supported on the stationary main frame;
   (f) a first connection member comprising two arm portions and a connecting portion to connect the two arm portions,
   wherein each of one ends of the two arm portions is pivotally supported on the second movable frame by a third pivot parallel with the first pivot, and each of the other ends is engaged with the first movable frame as a fourth pivot parallel with the first pivot, or each of one ends of the two arm portions is engaged with the second movable frame as a third pivot parallel with the first pivot, and each of the other ends is pivotally supported on the first movable frame by a fourth pivot parallel with the first pivot; and
   (g) a second connection member comprising two arm portions and a connecting portion to connect the two arm portions,
   wherein each of one ends of the two arm portions is pivotally supported on the second movable frame by a fifth pivot parallel with the second pivot, and each of the other ends is engaged to the first movable frame as a sixth pivot parallel with the second pivot, or each of one ends of the two arm portions is engaged with the second movable frame as a fifth pivot parallel with the second pivot, and each of the other ends is pivotally supported on the first movable frame by a sixth pivot parallel with the second pivot, and
   wherein each of the two arm portions of the first support member and each of the two arm portions of the first connection member are engaged with each other.

2. The lens barrel of claim 1, wherein the first support member has a pin representing the first pivot, provided at each of ends of the two arm portions, the first movable frame has an elongated hole, the first connection member has an elongated hole at each of the arm portions, and the pin is engaged with the elongated hole of the first support member and the elongated hole of the first connection member.

3. The lens barrel of claim 2, wherein when the first support member is rotated about the pivot of the first support member pivotally supporting the first support member on the stationary main frame, the pin of the first support member is in slidingly contact with the elongated hole of the first support member and the elongated hole of the first connection member, causes the first movable frame to move in the direction of the optical axis, and causes the first connection member to rotate about the fourth pivot, thereby causing the second movable frame to move in the direction of the optical axis.

4. The lens barrel of claim 1, wherein when the first movable frame is moved from a state in which the first movable frame and the second movable frame are telescopically inserted into the stationary main frame to a position in which the first movable frame is moved away from the stationary main frame, the first movable frame and the second movable frame are moved while the state in which the first movable frame and the second movable frame are telescopically inserted into the stationary main frame, is kept.

5. The lens barrel of claim 2, wherein when the first movable frame is moved from a state in which the first movable frame and the second movable frame are telescopically inserted into the stationary main frame to a position in which the first movable frame is moved away from the stationary main frame, the first movable frame and the second movable frame are moved while the state in which the first movable frame and the second movable frame are telescopically inserted into the stationary main frame, is kept.

6. The lens barrel of claim 1, wherein when the second movable frame is moved in the direction of the optical axis, the two arm portions of the second connection member are in slidingly contact with an outer surface of the second movable frame and an inner surface of the first movable frame.

7. A photographing apparatus comprising the lens barrel of claim 1.

8. The photographing apparatus of claim 7, further comprising a bending member which bends the optical axis of the lens held by the lens barrel, at substantially right angles, and the bending member is insertably and removably held on the optical axis.

9. The photographing apparatus of claim 8, wherein the first support member has a pin representing the first pivot, provided at each of ends of the two arm portions, the first movable frame has an elongated hole, the first connection member has an elongated hole at each of the arm portions, and the pin is engaged with the elongated hole of the first support member and the elongated hole of the first connection member.

10. The photographing apparatus of claim 9, wherein when the first support member is rotated about the pivot of the first support member pivotally supporting the first support member on the stationary main frame, the pin of the first support member is slidingly in contact with the elongated hole of the first support member and the elongated hole of the first connection member, causes the first movable frame to move in the direction of the optical axis, and causes the first connection member to rotate about the fourth pivot, thereby causing the second movable frame to move in the direction of the optical axis.

11. The photographing apparatus of claim 10, wherein when the photographing apparatus is not in use, the bending member is moved to a receded position thereof, the lens barrel is accommodated inside a camera body of the photographing apparatus in a state that the lens barrel is stored in the stationary main frame, and when the photographing apparatus is started, the first movable frame and the second movable frame are integrally protruded from the camera body of the photographing apparatus to a predetermined position.

12. The photographing apparatus of claim 11, wherein while the lens barrel is moved from the state that the lens barrel is stored in the camera body to the predetermined position, the elongated hole of the first connection member and the elongated hole of the first movable frame are overlapped with each other within a range in which the pin of the first support member is engaged with the respective elongated holes of the first connection member and the first movable frame, thereby the first connection member is not rotated.

13. The photographing apparatus of claim 10, wherein when the second movable frame is moved in the direction of the optical axis, the second connection member is in slidingly contact with an outer surface of the second movable frame and an inner surface of the first movable frame.

* * * * *